US009107236B2

(12) United States Patent
Guo et al.

(10) Patent No.: US 9,107,236 B2
(45) Date of Patent: Aug. 11, 2015

(54) METHOD AND APPARATUS FOR MULTICAST SCHEDULING IN WIRELESS NETWORKS

(75) Inventors: Katherine H. Guo, Scotch Plains, NJ (US); Arun N. Netravali, Westfield, NJ (US); Krishan K. Sabnani, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1040 days.

(21) Appl. No.: 11/744,531

(22) Filed: May 4, 2007

(65) Prior Publication Data

US 2008/0273458 A1    Nov. 6, 2008

(51) Int. Cl.
| | |
|---|---|
| *H04J 3/26* | (2006.01) |
| *H04W 72/12* | (2009.01) |
| *H04L 12/54* | (2013.01) |
| *H04L 12/801* | (2013.01) |
| *H04L 12/927* | (2013.01) |
| *H04L 12/911* | (2013.01) |
| *H04W 28/22* | (2009.01) |
| *H04W 72/00* | (2009.01) |
| *H04W 84/04* | (2009.01) |

(52) U.S. Cl.
CPC ....... *H04W 72/1257* (2013.01); *H04L 12/5695* (2013.01); *H04L 47/10* (2013.01); *H04L 47/806* (2013.01); *H04L 47/824* (2013.01); *H04W 28/22* (2013.01); *H04W 72/005* (2013.01); *H04W 84/042* (2013.01)

(58) Field of Classification Search
CPC . H04W 72/12; H04W 72/005; H04L 12/5695
USPC .................................................. 370/432, 234
See application file for complete search history.

(56) References Cited

U.S. PATENT DOCUMENTS

| | | | | |
|---|---|---|---|---|
| 6,728,775 | B1* | 4/2004 | Chaddha | 709/231 |
| 2005/0002352 | A1* | 1/2005 | Bao et al. | 370/328 |
| 2007/0115813 | A1* | 5/2007 | Hyon et al. | 370/229 |
| 2007/0177555 | A1* | 8/2007 | Brueck et al. | 370/338 |

OTHER PUBLICATIONS

Hyungsuk Won et al., "Multicast Scheduling in Cellular Data Networks," 26th Annual IEEE Conf. on Computer Communications, IEEE INFOCOM 2007, May 6-12, 2007, Anchorage, Alaska, USA.

* cited by examiner

*Primary Examiner* — Mark Rinehart
*Assistant Examiner* — Matthew Hopkins
(74) *Attorney, Agent, or Firm* — Wall & Tong, LLP (57) ABSTRACT

The invention includes a method and apparatus for scheduling multicast transmissions in a wireless network by selecting one of a plurality of multicast groups of a cellular region that is permitted to transmit information during a current timeslot. A method includes receiving data rate request values from wireless user terminals of each of a plurality of multicast groups, assigning a data rate to each multicast group using the data rate request values of wireless user terminals belonging to the respective multicast groups, selecting one of the multicast groups using the assigned data rates, and transmitting information to the selected one of the multicast groups at the associated assigned data rate. In one embodiment, the multicast scheduling algorithm may be a multicast proportional fairness (MPF) scheduling algorithm which attempts to maximize utility value of data received by individual users. In one embodiment, the multicast scheduling algorithm may be an inter-group proportional fairness (IPF) scheduling algorithm which attempts to maximize utility value of data received by multicast groups.

21 Claims, 7 Drawing Sheets

METHOD AND APPARATUS FOR MULTICAST SCHEDULING IN WIRELESS NETWORKS

FIELD OF THE INVENTION

The invention relates to the field of communication networks and, more specifically, to multicast transmissions in wireless networks.

BACKGROUND OF THE INVENTION

Third Generation (3G) wireless networks support data rates enabling a broader range of bandwidth-intensive services, such as streaming media, as well as more sophisticated services, such as services incorporating location information, e.g., regional traffic and weather reports, geographically targeted advertisements, and the like. Applications providing such services are naturally amenable to multicast transmission. While many unicast scheduling algorithms currently exist, few multicast scheduling algorithms currently exist, and the multicast scheduling algorithms that do exist significantly limit data throughput of user terminals close to the base station.

One existing approach is to offer fairness among all user terminals in all groups by making sure data transmission can be received by all user terminals in all groups in the cellular region. This approach fixes the data transmission rate to a default value (assuming that there is always at least one user terminal at the edge of the cellular region) and transmits to multicast groups in the cellular region in a round-robin manner. Existing CDMA EvDO networks use this approach; however, this scheme is oblivious of signal strength of user terminals such that user terminals close to the base station only receive limited data throughput even though their signal strength affords the ability for them to receive much higher data throughput. This approach sacrifices multicast data throughput for fairness.

Another existing approach is to improve multicast data throughput by partitioning user terminals with similar channel conditions into different multicast groups; however, due to channel condition dynamics and significant signaling overhead associated with multicast group membership changes, such a solution is not practical.

SUMMARY OF THE INVENTION

Various deficiencies in the prior art are addressed through the invention of a method and apparatus for scheduling multicast transmissions in a wireless network. A method according to one embodiment includes receiving data rate request values from wireless user terminals of each of a plurality of multicast groups of a cellular region, assigning a data rate to each multicast group using the data rate request values of wireless user terminals belonging to the respective multicast groups, selecting one of the multicast groups using the assigned data rates of the multicast groups, and transmitting information to the selected multicast group at the assigned data rate.

In one embodiment, the multicast scheduling algorithm may be implemented as a multicast proportional fairness (MPF) scheduling algorithm which attempts to maximize utility value of data received by individual users. A method of one embodiment of a MPF scheduling algorithm includes receiving data rate request values from wireless user terminals of each of a plurality of multicast groups of a cellular region, assigning a data rate to each multicast group using the data rate request values of wireless user terminals belonging to the respective multicast groups and average throughputs of respective wireless user terminals in each of the respective multicast groups, selecting one of the multicast groups using the assigned data rates of the multicast groups, and transmitting information to the selected multicast group at the assigned data rate.

In one embodiment, the multicast scheduling algorithm may be implemented as an inter-group proportional fairness (IPF) scheduling algorithm which attempts to maximize utility value of data received by multicast groups. A method of one embodiment of an IPF scheduling algorithm includes receiving data rate request values from wireless user terminals of each of a plurality of multicast groups of a cellular region, assigning a data rate to each multicast group using the data rate request values of wireless user terminals belonging to the respective multicast groups, selecting one of the multicast groups using the assigned data rates of the multicast groups and aggregate throughputs of the respective multicast groups, and transmitting information to the selected multicast group at the assigned data rate.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides improved multicast scheduling in wireless networks. The present invention includes methods for selecting one of multiple multicast groups in a cellular region as the multicast group that transmits information during a given timeslot, as well as assigning the data rate at which the selected multicast group transmits the information during the given timeslot. The multicast group selected to transmit during a given timeslot is selected using: (1) data rate request information received from wireless user terminals of the respective multicast groups over associated unicast channels (e.g., DRC feedback values); and (2) throughput information, which may include average throughputs of individual wireless user terminals or aggregate throughputs of respective multicast groups.

In one embodiment, the present invention may include a multicast proportional fairness (MPF) scheduling algorithm which attempts to maximize utility value of data received by individual users (i.e., to maximize happiness of individual users). In one embodiment, the present invention may include an inter-group proportional fairness (IPF) scheduling algorithm which attempts to maximize utility value of data received by multicast groups (i.e., to maximize happiness of multicast groups). In one embodiment, the present invention may include both a MPF scheduling algorithm and an IPF scheduling algorithm. An exemplary wireless network in which multicast scheduling according to the present invention may be implemented is depicted and described herein with respect to FIG. 1.

Figure 1:
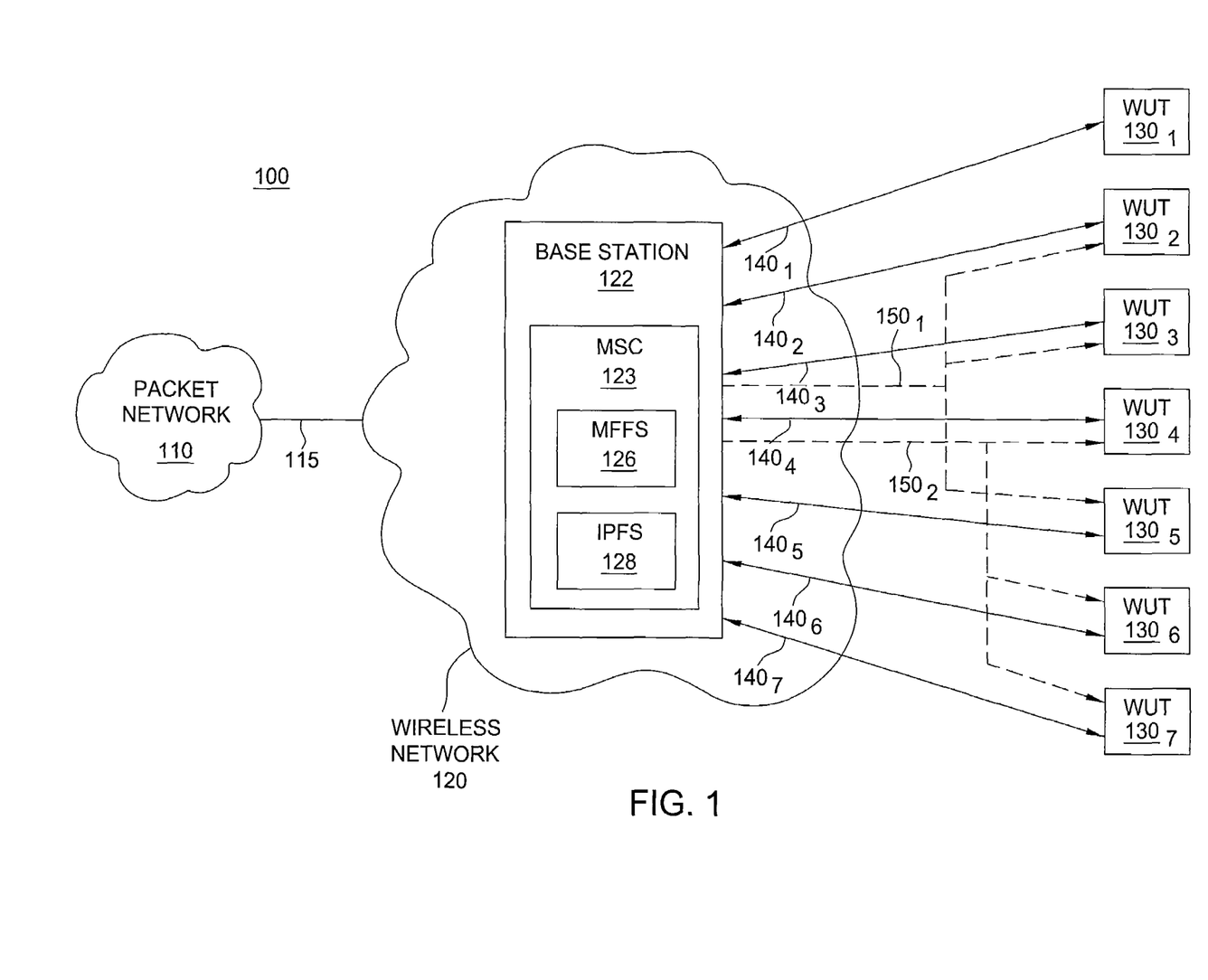
FIG. 1 depicts a high-level block diagram of a communication network.

FIG. 1 depicts a high-level block diagram of a communication network supporting unicast and multicast communications between a base station and wireless user terminals of a cellular region. Specifically, communication network 100 includes a packet network (PN) 110, a wireless network (WN) 120 having a base station (BS) 122, and a plurality of wireless user terminals (WUTs) $130_1$-$130_7$ (collectively, WUTs 130). The PN 110 propagates information to WN 120 for transmission to one or more of WUTs 130. The PN 110 communicates with WN 120, including BS 122, using a communication path (CP) 115. The BS 122 wirelessly communicates with WUTs 130.

The PN 110 may include any packet network(s) for propagating information to wireless networks for transmission to wireless user terminals. For example, PN 110 may include a private packet network, a public packet network (e.g., the Internet), and the like, as well as various combinations thereof. Although omitted for purposes of clarity, information propagated by PN 110 to WN 120 may originate from any source of information having access to PN 110, which may include content providers (e.g., live content sources, media servers, and the like), users, and the like, as well as various combinations thereof.

The WN 120 may include any wireless network supporting unicast communications and multicast communications. The WN 120 uses Time Division Multiplexing (TDM) to transmit data to WUTs. The WN 120 supports downstream communication of information to WUTs 130 using downstream unicast channels and/or multicast channels. The WN 120 supports upstream communication of information from WUTs 130 using upstream unicast channels. The WN 120 may include at least one base station supporting such communications (illustratively, BS 122). For example, WN 120 may be a Universal Mobile Telecommunications System (UMTS) network, a CDMA2000-based Evolution Data Optimized (EvDO) network, and the like.

The BS 122 communicates with WUTs 130 using unicast channels and multicast channels. As depicted in FIG. 1, BS 122 communicates with WUTs $130_1$-$130_7$ using respective unicast channels (UCs) $140_1$-$140_7$ (collectively, UCs 140). The UCs 140 comprise bidirectional wireless channels, enabling downstream transmissions from BS 122 to respective WUTs 130 and upstream transmissions from respective WUTs 130 to BS 122. As depicted in FIG. 1, BS 122 communicates with WUTs 130 using multicast channels (MCs) $150_1$ and $150_2$ (collectively, MCs 150). The MCs 150 comprise unidirectional wireless channels, enabling downstream transmissions from BS 122 to different groups of WUTs 130 (known as multicast groups).

The information transmitted downstream from BS 122 to WUTs 130 using UCs 140 and MCs 150 may include content, such as text content, audio content, image content, video content, multimedia content, and the like, as well as various combinations thereof. For example, such content may include text-based information such as news stories, weather reports, traffic reports, stock quotes, and the like, audio clips, still and animated images, video clips, software updates, and the like, as well as various combinations thereof. The information transmitted upstream from WUTs 130 to BS 122 may include control information, such as pilot signals, data rate requests (i.e., data rate control (DRC) feedback messages), and the like.

The WUTs 130 include any user terminals supporting wireless communications. The WUTs 130 receive information (e.g., control information, content, and the like) from BS 122 (illustratively, using UCs 140 and/MCs 150). The WUTs 130 present received information using one or more presentation interfaces (e.g., displays, speakers, and the like). The WUTs 130 interact with received information using one or more interaction interfaces (e.g., keyboards, keypads, touch screens, microphones, and the like). The WUTs 130 transmit information (e.g., pilot signals, data rate control (DRC) messages, and the like) to BS 122. For example, WUTs 130 may include any wireless user terminals, such as laptop computers, mobile phones, personal digital assistants (PDAs), and the like.

As depicted in FIG. 1, BS 122 supports multiple multicast groups. The MC $150_1$ propagates information from BS 122 to WUTs $130_2$, $130_3$, and $130_5$, which form a first multicast group supported by BS 122. The MC $150_2$ provides information from BS 122 to WUTs $130_4$, $130_6$, and $130_7$, which form a second multicast group supported by BS 122. The WUT $130_1$ does not belong to a multicast group. Although omitted for purposes of clarity, WUTs 130 may join and leave multicast groups at any time. Although depicted and described with respect to two multicast groups (for purposes of clarity in describing multicast scheduling functions of the present invention), multicast scheduling functions of the present invention may be utilized to schedule multicast transmissions from a base station supporting any number of multicast groups.

The BS 122 supports multicast scheduling functions of the present invention. The BS 122 includes a multicast scheduling controller (MSC) 123 supporting multicast functions of the present invention. The MSC 123 controls multicast transmissions from BS 122 to WUTs 130. Specifically, in each timeslot, MSC 123 selects one of the multicast groups to during that timeslot. The MSC 123 assigns a feasible data rate (alternatively referred to herein as a desired data rate or, simply, data rate) for each multicast group active in the cellular region during the timeslot, and selects one of the multicast groups to which information is transmitted during the timeslot based on the assigned feasible data rates of the multicast groups. The MSC 123 triggers BS 122 to transmit information to the selected multicast group during the timeslot. The BS 122 transmits information to the selected multicast group (at the feasible data rate of that selected multicast group) during that timeslot.

In one embodiment, MSC 123 includes a multicast proportional fairness (MPF) scheduler (MPFS) 126. A multicast scheduling algorithm which may be executed by MPFS 126 is depicted and described herein with respect to FIG. 3. In one embodiment, MSC 123 includes an inter-group proportional fairness (IPF) scheduler (IPFS) 128. A multicast scheduling algorithm which may be executed by IPFS 128 is depicted and described herein with respect to FIG. 4. In one embodiment, MSC 123 may include both MPFS 126 and IPFS 128. A general multicast scheduling algorithm applicable to multicast scheduling algorithms of MPFS 126 and IPFS 128 is depicted and described herein with respect to FIG. 2.

Figure 2:
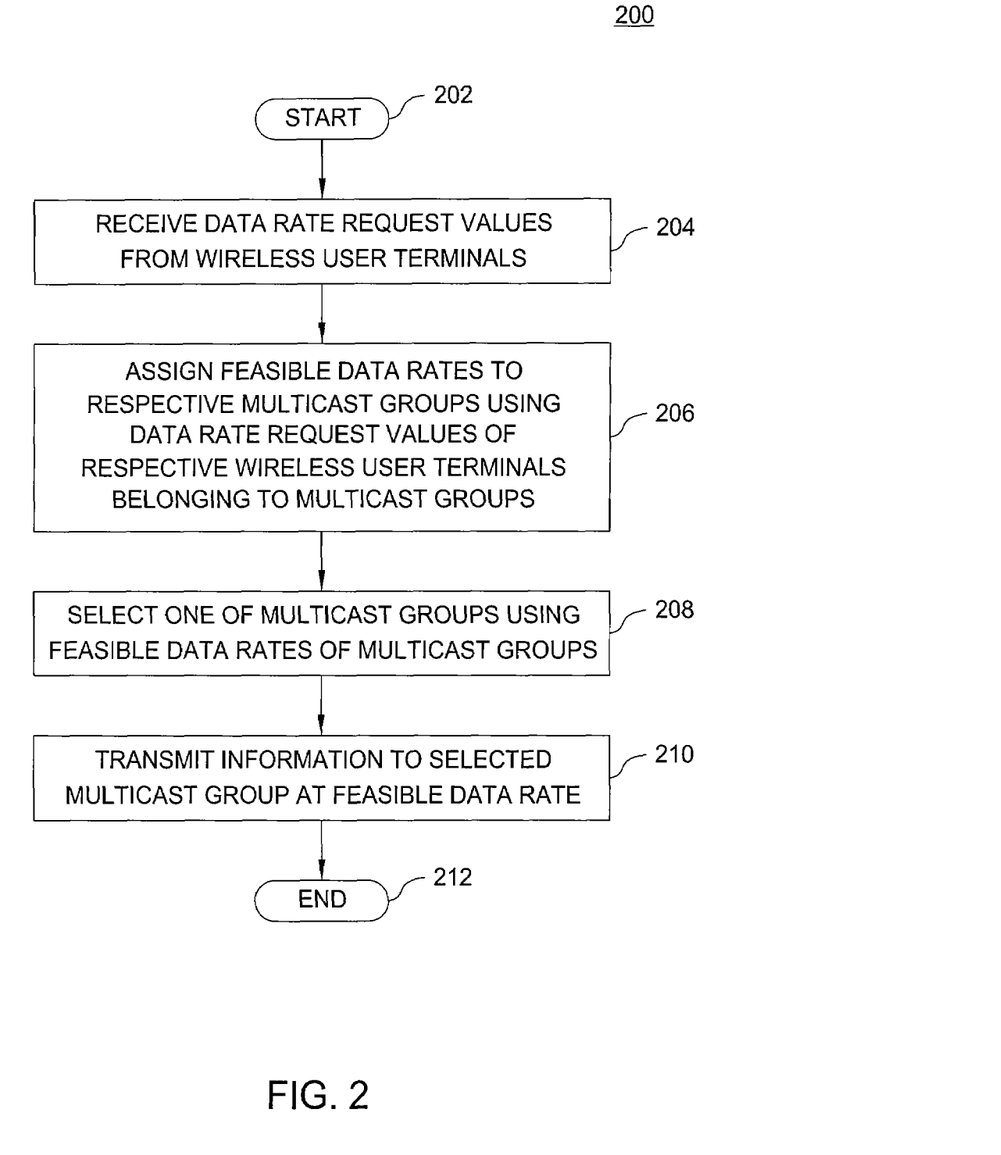
FIG. 2 depicts a method according to one embodiment of the present invention.

FIG. 2 depicts a method according to one embodiment of the present invention. Specifically, method 200 of FIG. 2 includes a method for transmitting information to multicast groups in a cellular region by selecting one of the multicast groups to which available information is transmitted and transmitting the available information to the selected multicast group at a data rate selected for (or assigned to) that multicast group. As described herein, method 200 of FIG. 2 may be executed by the base station of that cellular region.

Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, data rate request values (i.e., DRC feedback values) are received from wireless user terminals. The data rate request values are received from wireless user terminals over associated unicast wireless channels. The data rate request values may be received from all wireless user terminals in the cellular region. At step 206, a feasible data rate is assigned to each multicast group active in the cellular region. The feasible data rate assigned to a multicast group is assigned using data rate request values of respective wireless user terminals belonging to that multicast group. At step 208, one of the multicast groups is selected. The selected one of the multicast groups is selected using the feasible data rates of the multicast groups. At step 210, information is transmitted to the selected multicast group. The information is transmitted to the selected multicast group at the feasible data rate associated with the selected multicast group.

At step 212, method 200 ends. Although depicted and described as ending, as described herein method 200 is repeated by the base station in each timeslot in order to select one of the multicast groups to which information is transmitted during that timeslot. As described herein, method 200 of FIG. 2 may be adapted to produce specific results. In one embodiment, method 200 of FIG. 2 may be adapted to provide multicast proportional fairness (MPF), as depicted and described herein with respect to FIG. 3. In one embodiment, method 200 of FIG. 2 may be adapted to provide inter-group proportional fairness (IPF), as depicted and described herein with respect to FIG. 4.

Figure 3:
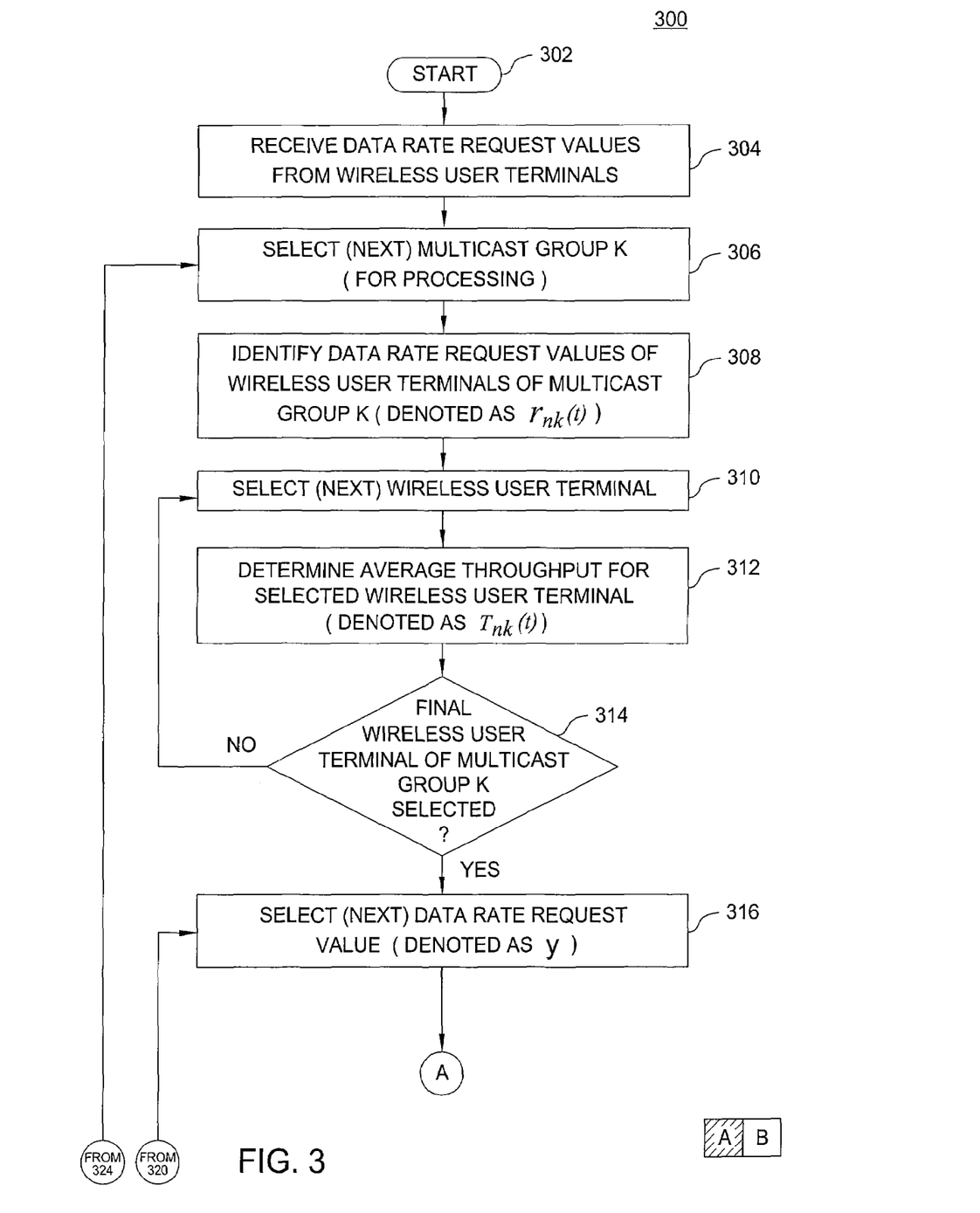
FIG. 3 depicts a method according to one embodiment of the present invention.

FIG. 3 depicts a method according to one embodiment of the present invention. Specifically, method 300 of FIG. 3 includes a method for selecting one of a plurality of multicast groups to which available information is transmitted and transmitting the available information to the selected multicast group at a data rate assigned to the selected multicast group. As described herein, method 300 of FIG. 3 is a multicast proportional fairness (MPF) algorithm. Although depicted and described as being performed serially, at least a portion of the steps of method 300 of FIG. 3 may be performed contemporaneously, or in a different order than depicted and described with respect to FIG. 3.

As depicted in FIG. 3, method 300 of FIG. 3 describes processing by a base station to select one of a plurality of multicast groups in a cellular region in order to transmit available information to wireless user terminals in that selected multicast group. The method 300 of FIG. 3 describes processing during one timeslot (denoted as current timeslot t) in order to select one of a plurality of multicast groups to which information is transmitted during that timeslot. In one embodiment, the various variables associated with method 300 may be initialized at the start of each execution cycle of method 300 (e.g., the number of multicast groups G may be determined and set, the current multicast group counter k may be set, the multicast group size S of each multicast group k (denoted as $S_k$) may be determined and set, the current wireless user terminal counter n may be set, and the like).

As depicted in FIG. 3, method 300 begins at step 302 and proceeds to step 304. At step 304, data rate request values are received from wireless user terminal. In one embodiment, data rate request values comprise DRC feedback values. The data rate request values are received over unicast channels of the respective wireless user terminals (i.e., one data rate request value is received from each wireless user terminal in the cellular region). At step 306, multicast group k is selected (for processing, since various values must be processed, computed, and evaluated for each of the multicast groups k active in the cellular region during the current timeslot t).

At step 308, each data rate request value of each wireless user terminal of multicast group k is identified (where data rate request value associated with wireless user terminal n in multicast group k is denoted as $r_{nk}(t)$). The data rate request values $r_{nk}(t)$ received from the wireless user terminals of multicast group k form the set of data rate values available for selection by the base station as the feasible data rate for multicast group k and, thus, each data rate value $r_{nk}(t)$ must be evaluated individually in order to determine the feasible (or desired) data rate for multicast group k (i.e., feasible or desired for transmitting information to wireless user terminals in multicast group k if multicast group k is selected to transmit during current timeslot t).

At step 310, one of the wireless user terminals of multicast group k is selected (denoted as wireless user terminal n).

At step 312, an average throughput for selected wireless user terminal n is determined (denoted as $T_{nk}(t)$).

In one embodiment, in which the average throughput for each wireless user terminal is computed in the current timeslot for use in the current timeslot, determining average throughput $T_{nk}(t)$ for selected wireless user terminal n comprises computing average throughput $T_{nk}(t)$ for selected wireless user terminal n.

In one embodiment, in which the average throughput for each wireless user terminal is computed in the current timeslot for use in the next timeslot, determining average throughput $T_{nk}(t)$ for selected wireless user terminal n comprises retrieving average throughput $T_{nk}(t)$ from memory (where the value was stored after being computed during the previous timeslot). In this embodiment, average throughput for selected wireless user terminal n is computed for use in the next timeslot (and, thus, is denoted as $T_{nk}(t+1)$). In one such embodiment, average throughput for selected wireless user terminal n for use the next timeslot is computed as exponential average throughput as follows:

$$T_{nk}(t+1) = \left(1 - \frac{1}{t_c}\right)T_{nk}(t) + \frac{1}{t_c}r_k^g(t)1_k^S(t)1_{\{r_k^g(t) \leq r_{nk}(t)\}} \qquad \text{Eq. 1}$$

With respect to computing average throughput for selected wireless user terminal n for use in the next timeslot, as defined in Eq. 1, $t_c$ is latency time scale in number of timeslots, $r_k^g(t)$ is the feasible data rate for group k, and the function $1_k^S(t)$ reflects the decision that the scheduler S makes regarding whether group k is selected for transmission during time slot t. The function $1_k^S(t)$ has a value of one if group k is selected, otherwise function $1_k^S(t)$ has a value of zero. In other words, wireless user terminal n in multicast group k will receive a feasible data rate of $r_k^g(t)$ only if the multicast group k is selected and the data rate request value $r_{nk}(t)$ of wireless user terminal n in multicast group k is no less than the feasible data rate $r_k^g(t)$.

At step 314, a determination is made as to whether the final wireless user terminal of multicast group k has been selected. If the final wireless user terminal of multicast group k has not been selected, method 300 returns to step 310, at which point the next wireless user terminal of multicast group k is selected (i.e., n=n+1 and processing is repeated). If the final wireless user terminal of multicast group k has been selected (i.e., the average throughput of each wireless user terminal in multicast group k has been determined), method 300 proceeds to step 316.

At step 316, one of the data rate request values $r_{nk}(t)$ for multicast group k is selected (for evaluation, using the average throughputs $T_{nk}(t)$ of wireless user terminals in multicast group k, for possible selection as the feasible data rate for multicast group k). The selected one of the data rate request values $r_{nk}(t)$ for multicast group k is denoted as selected data rate request value y. In other words, processing is performed assuming that the base station transmits information to multicast group k using selected data rate request value y, i.e., using a selected one of the data rate request values $r_{nk}(t)$ for multicast group k).

At step 318, a weighted aggregate data rate is computed for selected data rate request value y (denoted as $\phi_{k,t}(Y)$). The weighted aggregate data rate $\phi_{k,t}(Y)$ is computed using the received data rate request values $r_{nk}(t)$ and the average throughputs $T_{nk}(t)$ of wireless user terminals n of multicast group k. The weighted aggregate data rate $\phi_{k,t}(Y)$ is computed as a summation over each of the wireless user terminals in multicast group k (where only those wireless user terminals associated with received data rate request values $r_{nk}(t)$ that are greater than or equal to the selected data rate request value y are included for purposes of computing weighted aggregate data rate $\phi_{k,t}(Y)$ for selected data rate request value y).

In order to compute weighted aggregate data rate $\phi_{k,t}(Y)$ for selected data rate request value y, each of the received data rate request values $r_{nk}(t)$ is compared to the selected data rate request value y. If $r_{nk}(t) < y$, the effect of that wireless user terminal is ignored (i.e., the running total of weighted aggregate data rate $\phi_{k,t}(Y)$ is not incremented for that wireless user terminal). If $r_{nk}(t) \geq y$, the effect of that wireless user terminal is counted (i.e., the running total of weighted aggregate data rate $\phi_{k,t}(Y)$ is incremented for that wireless user terminal by a ratio of selected data rate request value y and average throughput $T_{nk}(t)$ of wireless user terminal n, i.e., $y/T_{nk}(t)$ where $1/T_{nk}(t)$ is the weight of wireless user terminal n). Thus, computation of weighted aggregate data rate $\phi_{k,t}(Y)$ for selected data rate request value y may be expressed as follows:

$$\varphi_{k,t}(y) = \sum_{n=1}^{S_k} \left( \frac{y}{T_{nk}(t)} \cdot 1_{[y \leq r_{nk}(t)]} \right) \qquad \text{Eq. 2}$$

As stated above, $1/T_{nk}(t)$ is the weight of wireless user terminal n which, intuitively, may be viewed as the degree of dissatisfaction because wireless user terminal n in multicast group k is more unhappy with less average throughput $T_{nk}(t)$. As a result, $\phi_{k,t}(Y)$ represents the degree of dissatisfaction in multicast group k that can be eliminated by the decision that data rate request value y is used to transmit to multicast group k during time slot t. In other words, with the MPF scheduling algorithm, the group satisfaction function for multicast group k is $\phi_{k,t}(Y)$.

At step 320, a determination is made as to whether the final data rate request value y has been selected (i.e., whether a weighted aggregate data rate $\phi_{k,t}(Y)$ has been computed for each of the received data rate request values $r_{nk}(t)$ for multicast group k). If the final data rate request value y has not been selected, method 300 returns to step 316, at which point the next received data rate request value $r_{nk}(t)$ is selected for use as the next selected data rate request value y (for use in determining the next weighted aggregate data rate $\phi_{k,t}(Y)$ for multicast group k). If the final data rate request value y has been selected, method 300 proceeds to step 322.

At step 322, one of the selected data rate request values y is assigned (or selected) as the feasible data rate for multicast group k (denoted as feasible data rate $r_k^g(t)$). In one embodiment, the one of the selected data rate request values y assigned as feasible data rate $r_k^g(t)$ is the selected data rate request value y associated with the maximum computed weighted aggregate data rate $\phi_{k,t}(Y)$. The feasible data rate $r_k^g(t)$ represents the transmission rate at which the weighted aggregate data rate of multicast group k is maximized. Since feasible data rate $r_k^g(t)$ is one of the selected data rate request values y, feasible data rate $r_k^g(t)$ is equal to one of the received data rate request values $r_{nk}(t)$. The assignment (or selection) of the feasible data rate $r_k^g(t)$ may be expressed as follows:

$$r_k^g(t) = \underset{y}{\operatorname{argmax}} \varphi_{k,t}(y) \qquad \text{Eq. 3}$$

At step 324, a determination is made as to whether the final multicast group k has been selected (i.e., whether a feasible data rate $r_k^g(t)$ has been assigned to each of the multicast groups active in the cellular region). If the final multicast group k has not been selected, method 300 returns to step 306, at which point the next multicast group k (i.e., k=k+1) is selected for processing in order to determine the feasible data rate $r_{k+1}^g(t)$ for next multicast group. If the final multicast group k has been selected, method 300 proceeds to step 326.

At step 326, one of the multicast groups k is selected as the multicast group permitted to transmit information during timeslot t. The multicast group k selected as the multicast group permitted to transmit during current timeslot t is selected using weighted aggregate data rates $\phi_{k,t}(r_k^g(t))$ for feasible data rates $r_k^g(t)$ of respective multicast group k in the cellular region.

In one embodiment, the one of the multicast groups selected as the multicast group permitted to transmit during current timeslot t is the multicast group k having the maximum weighted aggregate data rate $\phi_{k,t}(r_k^g(t))$ for associated feasible data rate $r_k^g(t)$ (i.e., the multicast group k associated with the maximum value of group satisfaction function among all groups; in other words, the maximum eliminated degree of dissatisfaction among all groups such that proportional fairness among wireless user terminals tends to be achieved). The selection of the multicast group permitted to transmit during current timeslot t (denoted as k(t)) may be expressed as follows (where G is the number of multicast groups in the cellular region):

$$k(t) = \underset{1 \leq k \leq G}{\operatorname{argmax}} \varphi_{k,t}(r_k^g(t)) \qquad \text{Eq. 4}$$

At step 328, information is transmitted to the selected multicast group k during current timeslot t at a data rate equal to the feasible data rate $r_k^g(t)$ of the selected one of the multicast groups. The information is multicast from the base station such that each of the wireless user terminals that belong to the selected one of the multicast groups k receives the transmitted information (if its data rate request value is greater than or equal to the feasible data rate $r_k^g(t)$).

At step 330, method 300 ends (for the current timeslot t). Although omitted for purposes of clarity, method 300 is repeated by the base station during each timeslot in order to select one of the multicast groups permitted to transmit information during that timeslot (and to determine the data rate at which the base station transmits information to wireless user terminals of the selected multicast group).

As described herein, method 300 is a multicast proportional fairness (MPF) scheduling algorithm (illustratively, executed by MPFS 126 of MSC 123 of BS 122 depicted and described with respect to FIG. 1). The MPF scheduling algorithm attempts to achieve proportional fairness among all wireless user terminals in the cell. In other words, the MPF scheduling algorithm attempts to maximize the happiness of individual users (as opposed to maximizing the happiness of multicast groups, as in the IPF scheduling algorithm).

The happiness (or utility value) of wireless user terminal n (and, thus, the user or users of wireless user terminal n) in multicast group k is defined as $\log(T_{nk})$, where $T_{nk}$ is the average throughput of the user terminal over a significantly large number of time slots. The happiness (or utility value) of wireless user terminal n increases if more data is received by wireless user terminal n. In other words, the happiness (or utility value) of wireless user terminal n increases quickly at the beginning and slows down gradually as its throughput increases, because of the log function. An objective of the MPF scheduling algorithm is to maximize the sum of $\log(T_{nk})$ over all wireless user terminals in all groups.

The MPF scheduling algorithm may be useful for multimedia content distribution in typical wireless networks such as 3G multicast data networks, 4G multicast data networks, and the like. Since the MPF scheduling algorithm may sometimes select data rates that cause certain users (at the far edge of the cellular region) to not be able to receive data during certain timeslots (which translates into lost packets and, thus, lost application frames), the MPF scheduling algorithm may be implemented in conjunction with one or more mechanisms adapted for preventing loss of packets by users at the far edge of the cellular region.

Figure 4:
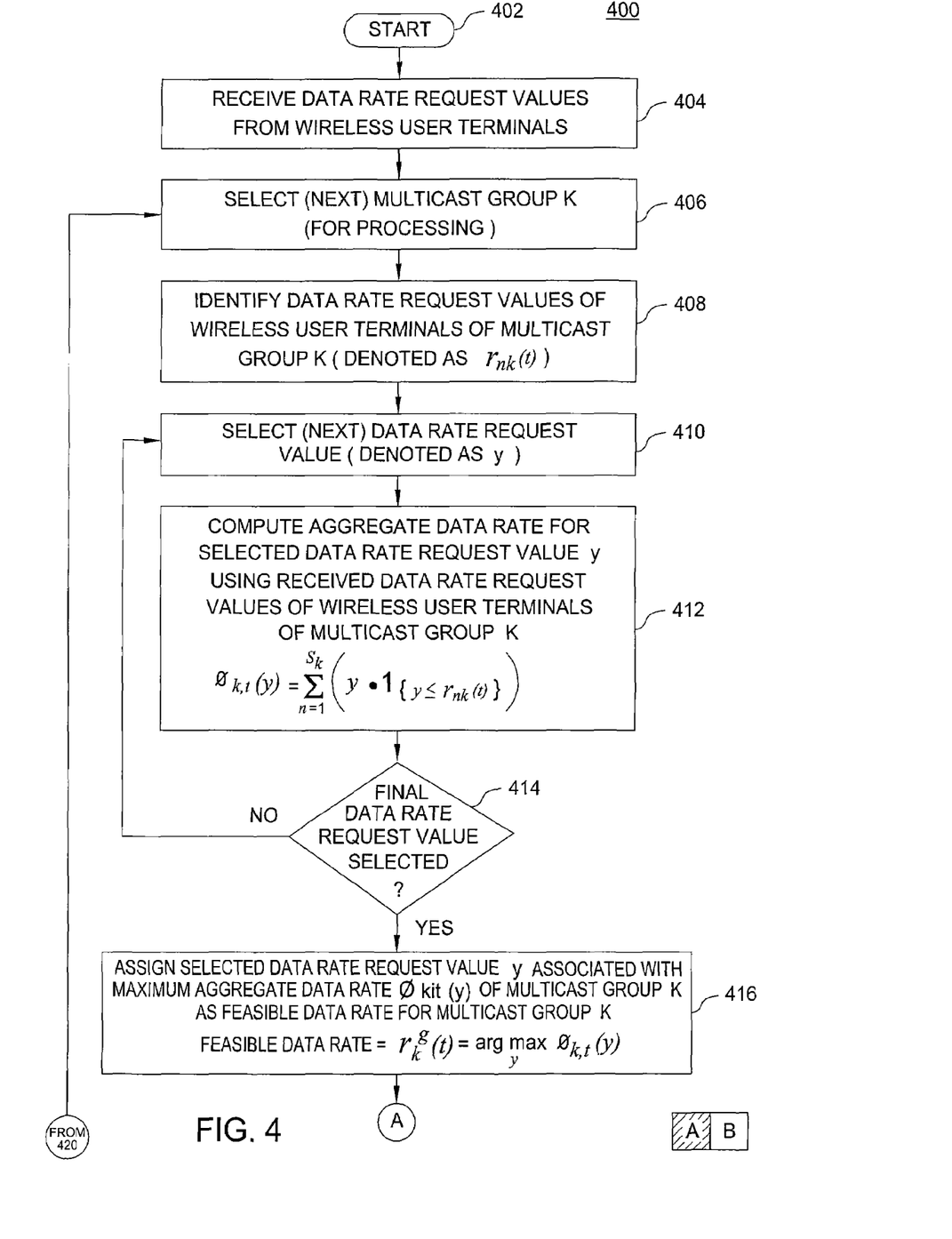
FIG. 4 depicts a method according to one embodiment of the present invention.

FIG. 4 depicts a method according to one embodiment of the present invention. Specifically, method 400 of FIG. 4 includes a method for selecting one of a plurality of multicast groups to which available information is transmitted and transmitting the available information to the selected multicast group at a data rate selected for that multicast group. As described herein, method 400 of FIG. 4 is an inter-group proportional fairness (IPF) algorithm. Although depicted and described as being performed serially, at least a portion of the steps of method 400 of FIG. 4 may be performed contemporaneously, or in a different order than depicted and described with respect to FIG. 4.

As depicted in FIG. 4, method 400 of FIG. 4 describes processing by a base station to select one of a plurality of multicast groups in a cellular region in order to transmit available information to wireless user terminals in that selected multicast group. The method 400 of FIG. 4 describes processing during one timeslot (denoted as current timeslot t) in order to select one of a plurality of multicast groups to which information is transmitted during current timeslot t. In one embodiment, the various variables associated with method 400 may be initialized at the start of each execution cycle of method 400 (e.g., the number of multicast groups G may be determined and set, the current multicast group counter k may be set, the multicast group size S of each multicast group k (denoted as $S_k$) may be determined and set, the current wireless user terminal counter n may be set, and the like).

As depicted in FIG. 4, method 400 begins at step 402 and proceeds to step 404. At step 404, data rate request values are received from wireless user terminal. In one embodiment, data rate request values comprise DRC feedback values. The data rate request values are received over unicast channels of the respective wireless user terminals (i.e., one data rate request value is received from each wireless user terminal in the cellular region). At step 406, multicast group k is selected (for processing, since various values must be processed, computed, and evaluated for each multicast group k active in the cellular region during the current timeslot t).

At step 408, each data rate request value of each wireless user terminal of multicast group k is identified (where the data rate request value associated with wireless user terminal n in multicast group k is denoted as $r_{nk}(t)$). The data rate request values $r_{nk}(t)$ received from the wireless user terminals of multicast group k form the set of data rate values available for selection by the base station as the feasible data rate for multicast group k and, thus, each of the different data rate request values $r_{nk}(t)$ must be evaluated individually in order to determine the feasible (or desired) data rate for multicast group k (feasible or desired for use in transmitting information to wireless user terminals in multicast group k if multicast group k is selected to transmit during current timeslot t).

At step 410, one of the data rate request values $r_{nk}(t)$ for multicast group k is selected (for evaluation for possible selection as the feasible data rate for multicast group k). The selected one of the data rate request values $r_{nk}(t)$ for multicast group k is denoted as selected data rate request value y. In other words, processing is performed assuming that the base station transmits information to multicast group k using selected data rate request value y, i.e., using a selected one of the data rate request values $r_{nk}(t)$ for multicast group k).

At step 412, an aggregate data rate is computed for selected data rate request value y using the received data rate request values $r_{nk}(t)$ for multicast group k (where the aggregate data rate is denoted as $\phi_{k,t}(Y)$). In order to compute aggregate data rate $\phi_{k,t}(Y)$ for selected data rate request value y, each of the received data rate request values $r_{nk}(t)$ is compared to the selected data rate request value y in order to determine the number of received data rate request values $r_{nk}(t)$ that are greater than or equal to the selected data rate request value y ($y \leq r_{nk}(t)$).

If $r_{nk}(t) < y$, the effect of that wireless user terminal is ignored (i.e., the running total of aggregate data rate $\phi_{k,t}(Y)$ is not incremented for that wireless user terminal). If $r_{nk}(t) \geq y$, the effect of that wireless user terminal is counted (i.e., the running total of aggregate data rate $\phi_{k,t}(Y)$ is incremented for that wireless user terminal). In other words, for each data rate request values $r_{nk}(t)$ that are greater than or equal to the selected data rate request value y, the selected data rate request value y is added to a running total of the aggregate data rate $\phi_{k,t}(Y)$. The computation of aggregate data rate $\phi_{k,t}(Y)$ for selected data rate request value y may be expressed as follows:

$$\phi_{k,t}(y) = \sum_{n=1}^{S_k} (y \cdot 1_{\{y \leq r_{nk}(t)\}}) \qquad \text{Eq. 5}$$

In one embodiment, since aggregate data rate $\phi_{k,t}(Y)$ is computed as a conditional summation of multiple instances of selected data rate request value y, aggregate data rate $\phi_{k,t}(Y)$ may be alternatively computed using multiplication. In one such embodiment, aggregate data rate $\phi_{k,t}(Y)$ for selected data rate request value y is computed by multiplying selected data rate request value y by the number of received data rate request values $r_{nk}(t)$ that are greater than or equal to the selected data rate request value y (where this number is identified by comparing each of the data rate request values $r_{nk}(t)$ to the selected data rate request value y in order to determine the number of data rate request values $r_{nk}(t)$ equal to or greater than selected data rate request value y).

At step 414, a determination is made as to whether the final data rate request value y has been selected (i.e., whether an aggregate data rate $\phi_{k,t}(Y)$ has been computed for each of the received data rate request values $r_{nk}(t)$ for multicast group k). If the final data rate request value y has not been selected, method 400 returns to step 410, at which point the next received data rate request value $r_{nk}(t)$ is selected for use as selected data rate request value y for use in determining the next aggregate data rate $\phi_{k,t}(Y)$ for multicast group k. If the final data rate request value y has been selected, method 400 proceeds to step 416.

At step 416, one of the selected data rate request values y is assigned (or selected) as the feasible data rate for multicast group k (denoted as feasible data rate $r_k^g(t)$). In one embodiment, the one of the selected data rate request values y assigned as feasible data rate $r_k^g(t)$ is the selected data rate request value y associated with the maximum computed aggregate data rate $\phi_{k,t}(Y)$. The feasible data rate $r_k^g(t)$ represents the transmission rate at which the aggregate rate of multicast group k is maximized. Since feasible data rate $r_k^g(t)$ is one of the selected data rate request values y, feasible data rate $r_k^g(t)$ is equal to one of the received data rate request values $r_{nk}(t)$. The assignment (or selection) of the feasible data rate $r_k^g(t)$ may be expressed as follows:

$$r_k^g(t) = \operatorname*{argmax}_{y} \phi_{k,t}(y) \qquad \text{Eq. 6}$$

At step 418, an aggregate throughput of multicast group k is computed (denoted as $r_k^g(t)$). The aggregate throughput $r_k^g(t)$ of multicast group k is computed as a summation of average throughputs of respective wireless user terminals in multicast group k. Specifically, aggregate throughput $r_k^g(t)$ of multicast group k is computed as follows:

$$T_k^g(t) = \sum_{i=1}^{S_k} T_{ik}(t), \qquad \text{Eq. 7}$$

where $T_{ik}(t)$ is the average throughput of wireless user terminal i of multicast group k for current timeslot t. The average throughput $T_{ik}(t)$ of each wireless user terminal i in multicast group k is updated at each timeslot t as an exponential average throughput, as follows:

$$T_{ik}(t+1) = \left(1 - \frac{1}{t_c}\right)T_{ik}(t) + \frac{1}{t_c} r_k^g(t) 1_k^S(t) 1_{\{r_k^g(t) \le r_{ik}(t)\}} \qquad \text{Eq. 8}$$

With respect to computing exponential average throughput $T_{ik}(t+1)$ for selected wireless user terminal i for use in the next timeslot, as defined in Eq. 8, $t_c$ is latency time scale in number of timeslots, $r_k^g(t)$ is the feasible data rate for group k, and the function $1_k^S(t)$ reflects the decision that the scheduler S makes regarding whether group k is selected for transmission during time slot t. The function $1_k^S(t)$ has a value of one if group k is selected, otherwise function $1_k^S(t)$ has a value of zero. In other words, wireless user terminal i in multicast group k will receive a feasible data rate of $r_k^g(t)$ only if the multicast group k is selected and the data rate request value $r_{ik}(t)$ of wireless user terminal i in multicast group k is no less than $r_k^g(t)$.

At step 420, a determination is made as to whether the final multicast group k has been selected (i.e., whether a feasible data rate $r_k^g(t)$ has been assigned to each of the multicast groups active in the cellular region). If the final multicast group k has not been selected, method 400 returns to step 406, at which point the next multicast group k (i.e., k=k+1) is selected for processing in order to determine the feasible data rate $r_{k+1}^g(t)$ and aggregate throughput $T_{k+1}^g(t)$ for the next multicast group. If the final multicast group k has been selected, method 400 proceeds to step 422.

At step 422, one of the multicast groups k is selected as the multicast group permitted to transmit information during current timeslot t. The multicast group k selected as the multicast group permitted to transmit during current timeslot t is selected using respective feasible data rates $r_k^g(t)$, aggregate data rates $\phi_{k,t}(r_k^g(t))$ for feasible data rates $r_k^g(t)$, and aggregate throughputs $T_k^g(t)$ of multicast groups k in the cellular region. In one embodiment, the multicast group k is selected for current timeslot t by computing a value for each of the multicast groups (which may be referred to as a group satisfaction function because of its usefulness in selecting the multicast group in a manner tending to achieve proportional fairness among multicast groups in the cellular region), and selecting the multicast group using the computed values of the multicast groups.

In one embodiment, the group satisfaction function of multicast group k is computed by dividing aggregate data rate $\phi_{k,t}(r_k^g(t))$ for feasible data rate $r_k^g(t)$ of multicast group k by aggregate throughput $T_k^g(t)$ of multicast groups k (i.e., $\phi_{k,t}(r_k^g(t))/T_k^g(t)$). In one embodiment, the one of the multicast groups selected as the multicast group permitted to transmit is the multicast group k associated with the maximum group satisfaction function (i.e., the maximum value of aggregate data rate $\phi_{k,t}(r_k^g(t))$ for feasible data rates $r_k^g(t)$ divided by aggregate throughput $T_k^g(t)$). In this embodiment, selection of the multicast group permitted to transmit during current timeslot t (denoted as k(t)) may be expressed as follows:

$$k(t) = \operatorname*{argmax}_{1 \le k \le G} \frac{\phi_{k,t}(r_k^g(t))}{T_k^g(t)} \qquad \text{Eq. 9}$$

In other words, the multicast group having the smaller amount of service provided up until the current timeslot (i.e., $T_k^g(t)$) compared to the capability of that multicast group (i.e., $\phi_{k,t}(r_k^g(t))$) is selected as the preferred multicast group permitted to transmit during current timeslot t (rather than merely selecting the multicast group having the maximum capability $\phi_{k,t}(r_k^g(t))$, which may result in starvation of multicast groups with wireless user terminals having lower quality channels).

As stated above, $1/T_k^g(t)$ is the weight of multicast group k which, intuitively, can be viewed as the degree of dissatisfaction because, as a whole, multicast group k is more unhappy with less aggregate throughput $T_k^g(t)$. As a result, $\phi_{k,t}(r_k^g(t))/T_k^g(t)$ represents the degree of dissatisfaction in multicast group k that can be eliminated by the decision that feasible data rate $r_k^g(t)$ is used to transmit to multicast group k during time slot t. In other words, with the IPF scheduling algorithm, the group satisfaction function for multicast group k is $\phi_{k,t}(r_k^g(t))/T_k^g(t)$.

At step 424, information is transmitted to the selected one of the multicast groups k during current timeslot t at a data rate equal to the feasible data rate $r_k^g(t)$ of the selected one of the multicast groups. The information is multicast from the base station such that each of the wireless user terminals that belong to the selected one of the multicast groups k receives the transmitted information. At step 426, method 400 ends (for the current timeslot t). Although omitted for purposes of clarity, method 400 is repeated by the base station during each timeslot in order to select one of the multicast groups permitted to transmit information during each timeslot (and to determine the data rate at which the base station transmits information to wireless user terminals of the selected multicast group).

As described herein, method 400 is an inter-group proportional fairness (IPF) scheduling algorithm (illustratively, executed by IPFS 128 of MSC 123 depicted and described herein with respect to FIG. 1). The IPF scheduling algorithm attempts to achieve proportional fairness among all multicast groups in the cellular region. The IPF scheduling algorithm attempts to maximize the happiness of multicast groups (as opposed to attempting maximizing the happiness of individual users, as in the MPF scheduling algorithm).

The happiness (or utility value) of multicast group k is defined as $\log(T_k^g)$, where $T_k^g$ is the aggregate throughput of multicast group k over significantly large number of time slots. The happiness (or utility value) of multicast group k increases if more data is received. The happiness (or utility value) of multicast group k increases quickly at the beginning and slows down gradually as its aggregate throughput increases because of the log function. An objective of the IPF scheduling algorithm is to maximize the sum of $\log(T_k^g)$ over all groups.

The IPF scheduling algorithm may be useful in delay-tolerant networks, possibly with nomadic users having intermittent connectivity. The IPF scheduling algorithm provides a social optimal and is useful when user terminals within the multicast groups can cooperatively download and share information within the multicast group (perhaps by forming an ad hoc network including members of the multicast group). Using the IPF scheduling algorithm, downloaded information may be source coded (e.g., using digital fountain codes or other codes) and the downloaded information may be subsequently reconciled within the multicast group.

Although primarily depicted and described herein with respect to a specific type and configuration of wireless network, the present invention may be used for multicast scheduling in various other types and configurations of wireless networks. Although primarily depicted and described with respect to an embodiment in which a MPF scheduler (running a MPF scheduling algorithm) and an IPF scheduler (running an IPF scheduling algorithm) are co-located on one base station, in other embodiments, the MPF scheduler and IPF scheduler may be implemented on different base stations (e.g., different base stations serving the same cellular region, different base stations serving different cellular regions, and the like, as well as various combinations thereof).

Although depicted and described as being implemented on a base station of a wireless network, in other embodiments one or more multicast schedulers may be implemented on one or more other components, such as other controllers of the wireless network, other controllers of the core network, and the like, as well as various combinations thereof. In such embodiments, the multicast group selected to transmit information during a given timeslot, as well as the data rate at which the information is to be transmitted to the multicast group, may be propagated from the one or more other components to an associated base station or other component of the wireless network for use in transmitting the information to the selected multicast group at the assigned data rate.

Figure 5:
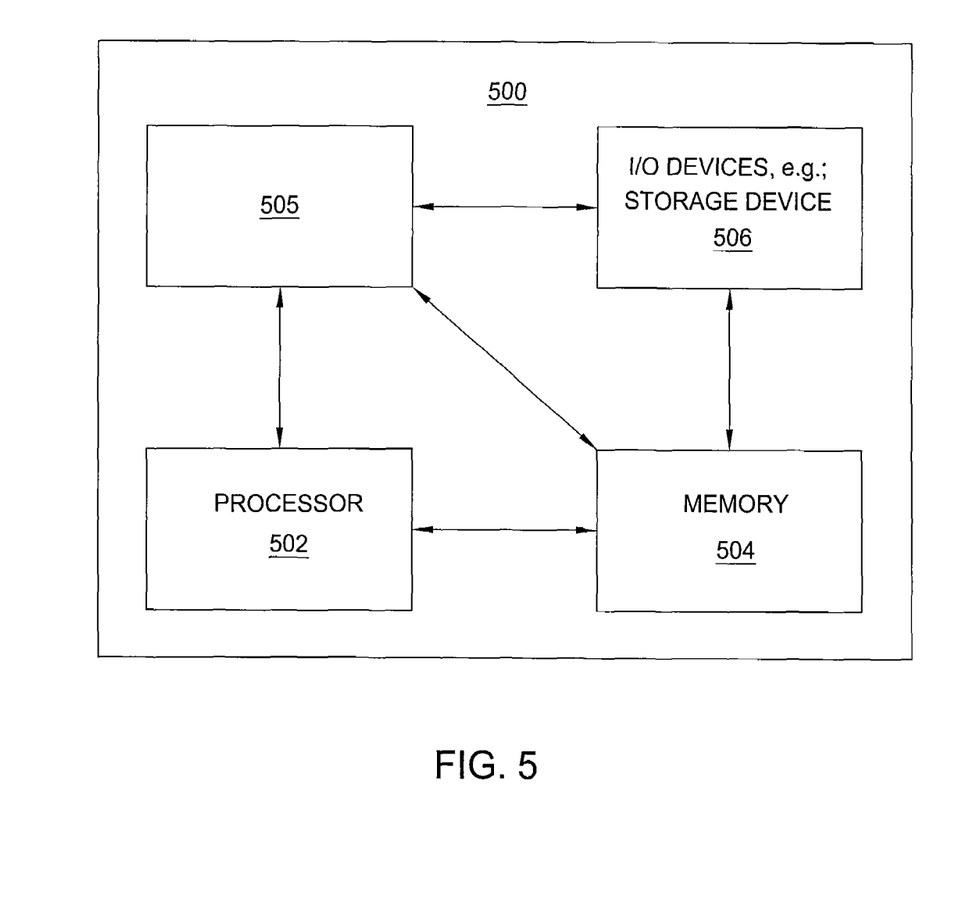
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), a multicast scheduling module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present multicast scheduling process 505 can be loaded into memory 504 and executed by processor 502 to implement the functions as discussed above. As such, multicast scheduling process 505 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for scheduling multicast transmissions in a wireless network, comprising:
    receiving, at a network element of the wireless network, data rate request values from wireless user terminals of each of a plurality of multicast groups;
    assigning, by the network element to each of the multicast groups, a respective assigned data rate where the respective assigned data rate is assigned to the respective multicast group based on a respective set of aggregate data rates computed for the respective multicast group based on the data rate request values of wireless user terminals of the respective multicast group, wherein, for each of the assigned data rates, the assigned data rate has associated therewith a respective one of the aggregate data rates from the respective set of aggregate data rates computed for the respective multicast group of the assigned data rate;
    selecting, by the network element based on the respective ones of the aggregate data rates associated with the assigned data rates of the respective multicast groups, one of the multicast groups for which information is to be transmitted downstream from the wireless network toward the wireless user terminals of the multicast groups; and transmitting information from the wireless network toward wireless user terminals of the selected multicast group.

2. The method of claim 1, wherein, for at least one of the multicast groups, the aggregate data rates are weighted aggregate data rates and assigning the respective assigned data rate to the multicast group comprises:

computing the weighted aggregate data rates for the multicast group by, for each of the data rate request values that is received from one or more wireless user terminals of the multicast group, selecting that data rate request value and computing a respective one of the weighted aggregate data rates for the selected data rate request value; and assigning one of the selected data rate request values as the respective assigned data rate for the multicast group based on the weighted aggregate data rates computed for the multicast group.

3. The method of claim 2, wherein, for at least one of the selected data rate request values for the respective multicast group, computing the respective one of the weighted aggregate data rates for the respective selected data rate request value comprises:

identifying each of the wireless user terminals of the multicast group having a respective received data rate request value that is equal to or greater than the selected data rate request value;

computing, for each of the identified wireless user terminals, a respective weighted data rate for the identified wireless user terminal; and computing the respective one of the weighted aggregate data rates for the selected data rate value by summing the weighted data rates computed for the identified wireless user terminals.

4. The method of claim 3, wherein, for at least one of the identified wireless user terminals, computing the respective weighted data rate for the identified wireless user terminal comprises:

dividing the selected data rate request value by an average throughput associated with the identified wireless user terminal.

5. The method of claim 2, wherein the one of the selected data rate request values that is assigned as the respective assigned data rate for the respective multicast group is the one of the selected data rate request values associated with a maximum weighted aggregate data rate of the weighted aggregate data rates.

6. The method of claim 1, wherein, for at least one of the multicast groups, assigning the respective assigned data rate to the multicast group comprises:

computing the aggregate data rates for the respective multicast group by, for each of the data rate request values that is received from one or more wireless user terminals of the multicast group, selecting that data rate request value and computing a respective one of the aggregate data rates for the selected data rate request value; and assigning one of the selected data rate request values as the respective assigned data rate for the respective multicast group based on the aggregate data rates computed for the multicast group.

7. The method of claim 6, wherein, for each of the selected data rate request values for the respective multicast group, computing the respective aggregate data rate for the respective selected data rate request value comprises:

identifying each of the wireless user terminals of the multicast group having a respective received data rate request value that is equal to or greater than the selected data rate request value;

determining a quantity of the identified wireless terminals having a respective received data rate request value that is equal to or greater than the selected data rate request value; and computing the aggregate data rate for the selected data rate request value by multiplying the selected data rate request value by the quantity of the identified wireless terminals.

8. The method of claim 6, wherein the one of the selected data rate request values that is assigned as the respective assigned data rate for the respective multicast group is the one of the selected data rate request values associated with a maximum aggregate data rate of the aggregate data rates.

9. The method of claim 6, wherein selecting one of the multicast groups for which information is to be transmitted downstream from the wireless network toward the wireless user terminals of the multicast group comprises:

for each of the multicast groups, computing a respective aggregate throughput of the multicast group;

for each of the multicast groups, computing a respective group satisfaction function value for the multicast group based on the respective assigned data rate of the multicast group, the respective aggregate data rate associated with the respective assigned data rate of the multicast group, and the respective aggregate throughput of the multicast group; and selecting the one of the multicast groups based on the respective group satisfaction function values of the multicast groups.

10. The method of claim 9, wherein, for at least one of the multicast groups, computing the respective group satisfaction function value for the multicast group comprises:

selecting one of the aggregate data rates computed for the respective multicast group, wherein the selected one of the aggregate data rates comprises the aggregate data rate associated with the respective assigned data rate for the multicast group; and dividing the selected one of the aggregate data rates computed for the respective multicast group by the aggregate throughput of the respective multicast group.

11. A network element configured for scheduling multicast transmissions in a wireless network, the network element comprising:

a processor and a memory communicatively connected to the processor, the processor configured for:

receiving, at the network element, data rate request values from wireless user terminals of each of a plurality of multicast groups;

assigning, by the network element to each of the multicast groups, a respective assigned data rate where the respective assigned data rate is assigned to the respective multicast group based on respective set of aggregate data rates computed for the respective multicast group based on the data rate request values of wireless user terminals of the respective multicast group, wherein, for each of the assigned data rates, the assigned data rate has associated therewith a respective one of the aggregate data rates from the respective set of aggregate data rates computed for the respective multicast group of the assigned data rate;

selecting, by the network element based on the respective ones of the aggregate data rates associated with the assigned data rates of the respective multicast groups, one of the multicast groups for which information is to be transmitted downstream from the wireless network toward the wireless user terminals of the multicast group; and transmitting information from the wireless network toward wireless user terminals of the selected multicast group.

12. The network element of claim 11, wherein, for at least one of the multicast groups, the aggregate data rates are weighted aggregate data rates and assigning the respective assigned data rate to the multicast group comprises:
computing the aggregate data rates for the respective multicast group by, for each of the data rate request values that is received from one or more wireless user terminals of the multicast group, selecting that data rate request value and computing a respective one of the weighted aggregate data rates for the selected data rate request value; and
assigning one of the selected data rate request values as the respective assigned data rate for the multicast group based on the weighted aggregate data rates computed for the multicast group.

13. The network element of claim 12, wherein, for at least one of the selected data rate request values for the respective multicast group, computing the respective one of the weighted aggregate data rates for the respective selected data rate request value comprises:
identifying each of the wireless user terminals of the multicast group having a respective received data rate request value that is equal to or greater than the selected data rate request value;
computing, for each of the identified wireless user terminals, a respective weighted data rate for the identified wireless user terminal; and
computing the respective one of the weighted aggregate data rates for the selected data rate request value by summing the weighted data rates computed for the identified wireless user terminals.

14. The network element of claim 13, wherein, for at least one of the identified wireless user terminals, computing the respective weighted data rate for the identified wireless user terminal comprises:
dividing the selected data rate request value by an average throughput associated with the identified wireless user terminal.

15. The network element of claim 12, wherein the one of the selected data rate request values that is assigned as the respective assigned data rate for the respective multicast group is the one of the selected data rate request values associated with a maximum weighted aggregate data rate of the weighted aggregate data rates.

16. The network element of claim 11, wherein, for at least one of the multicast groups, assigning the respective assigned data rate to the multicast group comprises:
computing the aggregate data rates for the respective multicast group by, for each of the data rate request values that is received from one or more wireless user terminals of the multicast group, selecting that data rate request value and computing a respective one of the aggregate data rates for the selected data rate request value; and
assigning one of the selected data rate request values as the respective assigned data rate for the respective multicast group based on the aggregate data rates computed for the multicast group.

17. The network element of claim 16, wherein, for each of the selected data rate request values for the respective multicast group, computing the respective aggregate data rate for the respective selected data rate request value comprises:
identifying each of the wireless user terminals of the multicast group having a respective received data rate request value that is equal to or greater than the selected data rate request value;
determining a quantity of the identified wireless terminals having a respective received data rate request value that is equal to or greater than the selected data rate request value; and
computing the aggregate data rate for the selected data rate request value by multiplying the selected data rate request value by the quantity of the identified wireless terminals.

18. The network element of claim 16, wherein selecting one of the multicast groups for which information is to be transmitted downstream from the wireless network toward the wireless user terminals of the multicast group comprises:
for each of the multicast groups, computing a respective aggregate throughput of the multicast group;
for each of the multicast groups, computing a respective group satisfaction function value for the multicast group based on the respective assigned data rate of the multicast group, the respective aggregate data rate associated with the respective assigned data rate of the multicast group, and the respective aggregate throughput of the multicast group; and
selecting the one of the multicast groups based on the group satisfaction function values of the respective multicast groups.

19. The network element of claim 18, wherein, for at least one of the multicast groups, computing the respective group satisfaction function value for the multicast group comprises:
selecting one of the aggregate data rates computed for the respective multicast group, wherein the selected one of the aggregate data rates comprises the aggregate data rate associated with the respective assigned data rate for the multicast group; and
dividing the selected one of the aggregate data rates computed for the respective multicast group by the aggregate throughput of the respective multicast group.

20. The network element of claim 16, wherein the one of the selected data rate request values that is assigned as the respective assigned data rate for the respective multicast group is the one of the selected data rate request values associated with a maximum aggregate data rate of the aggregate data rates.

21. A non-transitory computer-readable storage medium storing a software program, that, when executed by a computer, causes the computer to perform a method for scheduling multicast transmissions in a wireless network, the method comprising:
receiving, at a network element of the wireless network, data rate request values from wireless user terminals of each of a plurality of multicast groups of a cellular region;
assigning, by the network element to each of the multicast groups, a respective assigned data rate where the respective assigned data rate is assigned to the respective multicast group based on respective set of aggregate data rates computed for the respective multicast group based on the data rate request values of wireless user terminals of the respective multicast group, wherein, for each of the assigned data rates, the assigned data rate has associated therewith a respective one of the aggregate data rates from the respective set of aggregate data rates computed for the respective multicast group of the assigned data rate;

selecting, by the network element based on the respective ones of the aggregate data rates associated with the assigned data rates of the respective multicast groups, one of the multicast groups for which information is to be transmitted downstream from the wireless network toward the wireless user terminals of the multicast group; and transmitting information from the wireless network toward wireless user terminals of the selected multicast group.

\* \* \* \* \*